June 6, 1939.  P. SORDOILLET  2,161,536
NAVIGATING INSTRUMENT
Filed April 8, 1937  2 Sheets-Sheet 1
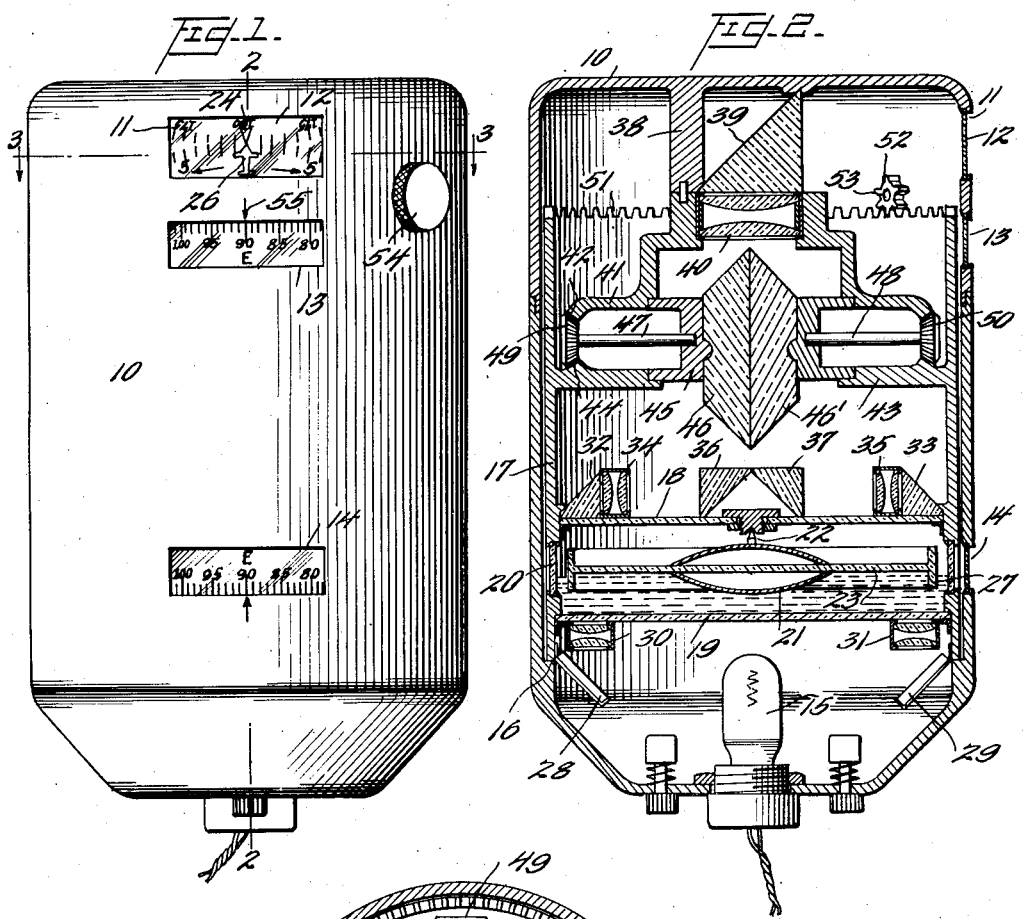
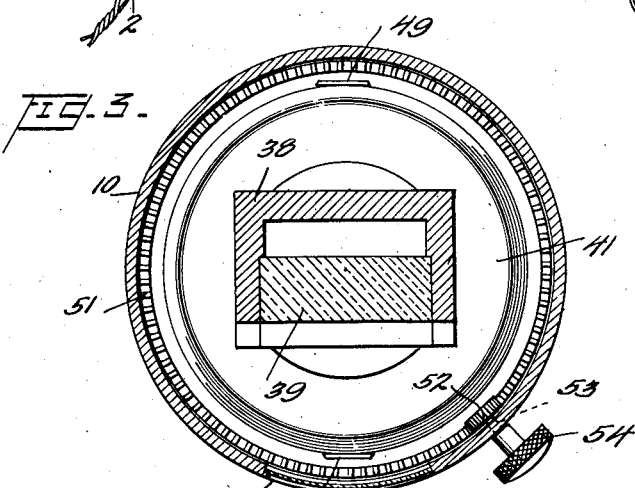
Inventor
Pierre Sordoillet
By Bateson, Cist-Morse
& Chindling
Att'ys June 6, 1939.  P. SORDOILLET  2,161,536
NAVIGATING INSTRUMENT
Filed April 8, 1937  2 Sheets-Sheet 2
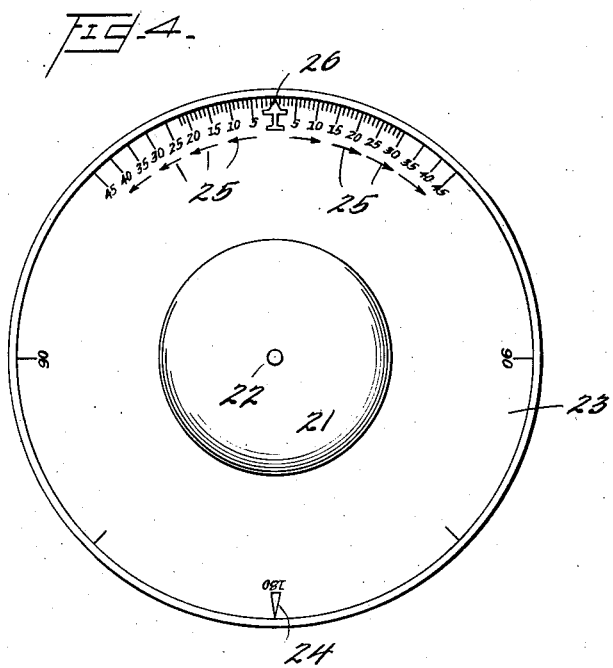
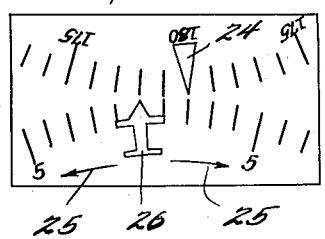 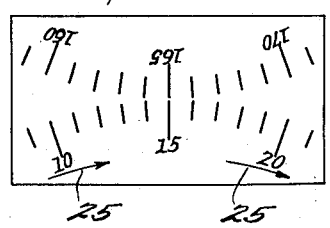
Inventor
Pierre Sordoillet
By Watson, Cole, Grindle & Watson
Attys

Patented June 6, 1939

2,161,536

UNITED STATES PATENT OFFICE 2,161,536

NAVIGATING INSTRUMENT

Pierre Sordoillet, Paris, France

Application April 8, 1937, Serial No. 135,807

10 Claims. (Cl. 88—24)

This invention relates to instruments for use in maritime and aerial navigation and particularly to instruments for facilitating the maintenance of a predetermined course of travel. Such instruments are of special value in connection with aerial navigation, in which the pilot ordinarily has other important duties in addition to steering the airplane or airship, and must be able to maintain the vessel upon the correct course with a minimum of effort and attention.

The maintenance of the correct course by means of an ordinary magnetic compass demands the sustained attention of the pilot due to the fact that he is obliged constantly to watch the graduations of the compass rose and to maintain the correct one before the fixed index point. Since the graduations of a compass of convenient size are quite minute, the use of an ordinary compass therefore requires a great deal of attention on the part of the pilot.

In order to render the pilot's task as easy as possible, it is desirable that any deviation of the vessel from its true course shall be indicated in a manner which will draw the instant attention of the pilot. It is also desirable that an indication be furnished which will enable the pilot to direct the vessel back to the true course, without being obliged to read the graduations of the compass rose. It is likewise desirable, in certain instances, that the course of the vessel, as indicated by the index by means of which the pilot directs the vessel, may be altered by the navigating officer without the necessity of verbal instructions to the pilot, and in certain instances it is desirable that this alteration of the course, and corresponding adjustment of the index, may be made from a distance, for example, from an entirely separate compartment of the vessel.

The several conditions of the foregoing problem have been realized in part by means heretofore adopted, such as the repeating compass, the electromagnetic compass, and similar instruments. However, these instruments are delicate and complicated in nature, are quite likely to get out of order, and are very costly. The problem has also been partially solved by means of ordinary compasses equipped with optical systems for projecting enlarged images of the rose upon a screen, or provided with means whereby the pilot is enabled to steer according to a preadjusted index, instead of by the graduations of the compass rose.

The present invention has for its general object the provision of a magnetic compass equipped with devices answering the aforesaid conditions and improving upon the instruments hereinbefore mentioned. It is the object of the present invention to provide, in a device of the character in question, means whereby the pilot is enabled to maintain a predetermined course merely by observing the relative positions of two prominent indices, without regard to the direction of travel as indicated by the ordinary compass rose, the slightest deviation of the vessel from the true course being indicated by a relatively large movement of one or both of the indices.

A further object is the provision of means whereby, when the vessel has deviated from the true course, the pilot will be instantly apprised, without consulting the ordinary compass rose, of the extent of the deviation and the direction in which he must guide the vessel in order to regain the true course.

Another object is the provision of means for adjusting said indices in accordance with a desired course of travel, the direction of the course being indicated visibly so as to facilitate the said adjustment and at the same time provide a constant visible indication of the course which has been set.

A further object is the provision, in an instrument in which the compass rose is enclosed within a casing, of means whereby, should the auxiliary devices fail in any respect, the pilot may maintain his course by consulting the compass rose, without dismantling the instrument or disturbing it in any way.

Other and further objects, features, and advantages will be apparent from the description which follows taken in connection with the accompanying drawings in which:

Figure 1 is a front elevation of an instrument embodying the various features of the present invention;

Figure 2 is a vertical section on line 2—2 of Figure 1;

Figure 3 is a horizontal section on line 3—3 of Figure 1;

Figure 4 is a plan view of a compass rose suitable for use in connection with the present invention; and Figures 5 and 6 illustrate the appearance, under certain conditions, of the indicia according to which the pilot normally directs the vessel.

In order to facilitate an understanding of the invention, specific language is employed in describing the various elements shown in the drawings which constitute the preferred form of the invention. It will nevertheless be understood that no limitation of the invention is thereby intended but that various alterations and changes are contemplated such as fall within the scope of the invention.

Referring to the drawings, the numeral 10 designates a casing, which may be formed of any suitable material, and is preferably cylindrical in shape. The casing 10 is provided with a window 11 in which is fitted a projection screen 12 of any suitable material such for example as ground glass. The casing 10 is also provided with windows 13 and 14 for purposes to be hereinafter explained.

At the bottom of the casing 10 is provided a suitable light source such as an incandescent lamp 15. Within the casing 10 and rotatably supported upon an annular shoulder 16 thereof is a frame 17 which is preferably in the form of a cylindrical shell. Secured to and supported by the frame 17 are transparent plates 18 and 19, which comprise the top and bottom members of a compass bowl, the cylindrical wall of which is comprised of a transparent annulus 20, secured to and connecting the adjacent portions of the frame 17. A compass rose 21 floats in a suitable liquid within the compass bowl, in the usual manner, and is centered in position by means of a needle 22, also in the usual manner. The horizontal portion 23 of the compass rose is preferably opaque, and is provided with translucent portions comprising the graduations and indices as illustrated in Figure 4. The graduations are preferably numbered up to 180° in each direction from the North point 26 to the South point 24. In addition to the graduations the rose is also provided with a number of translucent arrows 25 extending from the North point 26 in both directions, through a portion of the circumference of the rose, for example about 45° each way from the North point.

The rose 21 is provided with a vertical peripheral flange 27 on which are engraved or printed conventional graduations as may be seen through the window 14 (Figure 1). At points 180° apart at the lower edge of the frame 17 there are secured mirrors 28 and 29, which are inclined at an angle of 45° to the vertical. Directly above the respective mirrors, and secured in any suitable manner to the frame 17, condensers 30 and 31 are provided. Above the transparent plate 18, and located directly above the condensers 30 and 31, total reflecting prisms 32 and 33 are secured to the frame 17. Adjacent the inner faces of the latter are located projectors or image-forming devices 34 and 35 and located on the common optical axis of the latter are a second pair of total reflecting prisms 36 and 37.

The upper portion of the casing 10 is provided with a central, downwardly projecting portion 38 in which is secured a total reflecting prism 39 and a second projector or image-forming device 40. The downwardly extending portion 38 is provided at its lower extremity with a laterally extending flange 41, the toothed periphery of which constitutes a bevel gear 42. An inwardly projecting annular flange 43 of the frame 17 is similarly toothed to form bevel gear 44.

A spool 45 is rotatably mounted between the flanges 41 and 43 and carries centrally thereof a double Wollaston prism 46, 46'. Journalled in the spool 45 are diametrically opposed spindles 47 and 48 provided at their respective outer ends with bevel pinions 49 and 50, each of which meshes with bevel gears 42 and 44. The frame 17 is provided at its upper end with a crown gear 51. A pinion 52, which meshes with the crown gear 51, is secured upon a short shaft 53 which extends through and is journalled in the casing 10, and is provided at its outer end with a knurled button 54.

By grasping and turning the button 54, the frame 17 may be rotated within the casing, carrying with it the mirrors 28, 29, condensers 30, 31, prisms 32, 33, projectors 34, 35, and prisms 36, 37. By virtue of such rotational movement of the frame 17, it will be apparent that the spool 45, carrying the prism 46, 46', will be rotated at one-half the speed of the frame. The frame 17 is provided, exteriorly of its upper end portion, with an annular series of graduations similar to the graduations of the flange 27 of the compass rose, such graduations being visible through the window 13. It is therefore apparent that the movements of the frame 17 may be followed, and the desired adjustment thereof ensured, by watching the aforementioned graduations through the window 13.

By virtue of the optical system just described, it will be understood that real images of diametrically opposed portions of the compass rose will be projected upon the screen 12, the image formed by the projector 34 being lowermost upon the screen and the image formed by the projector 35 being uppermost. Therefore, if it be assumed that the plane of Figure 2 lies north and south, with the North point of the compass rose lying at the left, the complete image formed upon the screen 12 will be as illustrated in Figure 1. The operation of the device is as follows.

Assuming that the instrument is correctly mounted upon the axis of a vessel and that the vessel is headed due north, and also assuming that the desired course is due east, the pilot or navigator will turn the button 54 until the frame 17 and its associated mechanism has been rotated into the position illustrated in Figure 1, wherein the East point, as indicated by the graduations engraved upon the frame 17, comes opposite the index line 55 formed upon the exterior of the casing. By virtue of this adjustment, the frame 17 is moved through 90° and the Wollaston prism 46, 46' is moved through 45°. The projectors 34 and 35 are therefore registered, optically, with the East and West points of the compass rose, and images of those points, turned through 90° by passing through the prisms 46, 46', will be projected upon the screen 12. Now if the pilot of the vessel directs the latter to the desired course, the rotation of the entire system relative to the compass rose will result in the projectors 34 and 35 being again optically registered with the North and South points of the rose, and the images projected upon the screen 12 will appear as in Figure 1.

Upon any deviation of the vessel from the course set, the images of the North and South points, respectively, will move in opposite directions on the screen 12. Thus, as illustrated in Figure 5, if the vessel deviates from the desired course to the extent of 1°, the images of the North and South points of the rose will separate, on the screen 12, to the extent of 2°. The degree of magnification of the system may be adjusted as desired. In the embodiment described and illustrated, the degree of magnification is approximately 3 and therefore it will be apparent that the distance between the images of the North and South points, as seen on screen 12, will be six times as great as the deviation which would occur between the index line and the compass rose of an ordinary compass of equivalent size. Therefore, the slightest deviation of the vessel from its true course is readily apparent to the pilot. Conversely, in order to maintain the vessel on its true course it is only necessary for the pilot to keep the images of the North and South points of the rose in the position illustrated in Figure 1, which may be done with facility and without consulting the graduations of the actual rose or the graduations as projected on the screen.

In case the vessel deviates from the desired course to such an extent that the images of the North and South points disappear entirely from the screen 12, the situation will be as illustrated in Figure 6, in which it has been assumed that the vessel is 15° off its course. That fact will be instantly apparent to the pilot, and he is also apprised, by the arrows 25, that the vessel should be directed toward the right in order to regain the course. Thus it will be seen that the piloting of the vessel along the desired course is accomplished with extreme simplicity.

Since it is only necessary to rotate the pinion 52 in order to adjust the instrument to any desired course, it will be obvious that the instrument may be adjusted from any reasonable distance, it being only necessary to provide a longer shaft, either rigid or flexible, between the button 54 and pinion 52. Likewise the instrument may be mounted a considerable distance behind the instrument board, and the focal length of the projector 40 adjusted so that the images will be focused upon a screen provided in the instrument board. Other possible arrangements will occur to those skilled in the art. The choice of the various elements of the optical system employed is not critical, and various modifications and substitutions may be made therein, such as replacing the several total reflecting prisms with mirrors, varying the focal lengths of the several projectors, etc.

If desired, the projector 35 may be omitted, in which case an image of the North point only of the rose will be projected upon the screen 12. In such case, a fixed index will be arranged in a central position on or adjacent the screen. If the projector 35 is omitted the other elements of the optical system of which it is a part, including the prism 46', may likewise be omitted. However, it is preferred to employ both of the projectors 34 and 35 in order to secure the advantage described above, namely, that of having two movable images adapted to move in opposite directions in the event of a deviation of the vessel from the predetermined course.

An important advantage of the present invention lies in the fact that its accuracy will not be affected by any eccentricity of translational displacement of the compass rose, the position of the respective North and South images being affected only by relative rotation of the vessel and the compass rose.

In the appended claims the expression "axis of the rose" is intended to refer to the normal axis of the rose, i. e., the position occupied by its axis when the rose is horizontally disposed, as is the normal case.

It is obvious that the Wollaston prisms 46, 46' may be replaced by any system of prisms or mirrors which will perform the function of rotating an image or light beam for the purpose stated, and it is not intended that the present invention be limited to the use of a Wollaston prism, specifically. The term "Wollaston prism", as used for convenience in the appended claims is therefore intended to include equivalent means which may be employed for rotating an image or light beam.

Having thus described the invention, what is claimed as new and desired to be secured by Letters Patent is:

1. In a device of the character described, a compass rose, a fixed screen, and means for projecting an image of a marginal portion of said rose upon said screen, said projecting means comprising a source of illumination, means for reflecting light from a marginal portion of said rose toward the axis thereof, means for reflecting said light in a path parallel to and adjacent the extended axis of said rose, a Wollaston prism mounted in the path of said light reflected by said second means and rotatable about the axis of said rose, and image-forming means in the optical path between said rose and said screen, said first reflecting means being rotatable about the axis of said rose in accordance with the desired course of travel.

2. A device according to claim 1, said compass rose having a vertical peripheral flange bearing compass graduations on its outer surface.

3. A device according to claim 1, said source of illumination being located on the opposite side of said rose from said first reflecting means, said rose having translucent portions adapted to transmit light from said source to said first reflecting means.

4. In a device of the character described, a compass rose, a fixed screen, and means for projecting an image of a marginal portion of said rose upon said screen, said projecting means comprising a source of illumination, means for reflecting light from a marginal portion of said rose toward the axis thereof, means for reflecting said light in a path parallel to and adjacent the extended axis of said rose, a Wollaston prism mounted in the path of said light reflected by said second means and rotatable about the axis of said rose, and image-forming means in the optical path between said rose and said screen, said first reflecting means being rotatable about the axis of said rose in accordance with the desired course of travel, and said Wollaston prism being operatively connected with said first reflecting means for rotation in the same direction therewith and at one half the angular velocity thereof.

5. In a device of the character described, a compass rose, a fixed screen, and means for projecting images of opposite marginal portions of said rose in juxtaposition on said screen, said projecting means comprising a source of illumination, a pair of opposed reflecting members for reflecting beams of light from opposite marginal portions of said rose toward the axis thereof, means for reflecting said light beams in paths parallel to and adjacent the extended axis of said rose, a double Wollaston prism mounted in the paths of said light beams and rotatable about the axis of said rose, and image-forming means in the path of each said light beam between said rose and said screen, said first pair of reflecting members being rotatable about the axis of said rose in accordance with the desired course of travel.

6. In a device of the character described, a compass rose, a fixed screen, and means for projecting images of opposite marginal portions of said rose in juxtaposition on said screen, said projecting means comprising a source of illumination, a pair of opposed reflecting members for reflecting beams of light from opposite marginal portions of said rose toward the axis thereof, means for reflecting said light beams in paths parallel to and adjacent the extended axis of said rose, a double Wollaston prism mounted in the paths of said light beams and rotatable about the axis of said rose, and image-forming means in the path of each said light beam between said rose and said screen, said first pair of reflecting members being rotatable about the axis of said rose in accordance with the desired course of travel and said Wollaston prisms being operatively connected with said first pair of reflecting members for rotation in the same direction therewith and at one half the angular velocity thereof.

7. In a device of the character described, a compass rose, a fixed screen, and means for projecting an image of a marginal portion of said rose upon said screen, said projecting means comprising a source of illumination, means for reflecting light from a marginal portion of said rose toward the axis thereof, means for reflecting said light in a path parallel to and adjacent the extended axis of said rose, a Wollaston prism mounted in the path of said light reflected by said second means and rotatable about the axis of said rose, image-forming means in the optical path between said rose and said screen, means for adjusting the position of said first reflecting means in accordance with a selected course, and visible means for indicating the selected course.

8. In a device of the character described, a casing, a window in said casing provided with a translucent screen, a frame rotatable within said casing, a compass rose universally mounted in said frame, an optical system for projecting an image of a marginal portion of said rose upon said screen, said optical system comprising reflecting members carried on said frame for reflecting a beam of light from a marginal portion of said rose in a path parallel to and adjacent the extended axis of said rose, a Wollaston prism rotatably mounted in said casing and in the path of said light beam, and image-forming means in said path, means operable from without said casing for rotating said frame, and means connecting said prism and said frame for rotating said prism in the same direction and at one half the angular velocity of said frame.

9. A device according to claim 8, said rotatable frame having an annular portion bearing compass graduations, and said casing having a window adapted to expose a portion of said graduations, whereby the angular position of said frame relative to said casing may be observed from outside said casing.

10. A device according to claim 8, said compass rose having a vertical flange bearing compass graduations on its outer surface, and said casing having a window adapted to expose a portion of said graduations, whereby said compass rose may be read from outside said casing.

PIERRE SORDOILLET.